Feb. 2, 1932. J. W. WATSON 1,843,855
SHOCK ABSORBER
Filed May 22, 1930
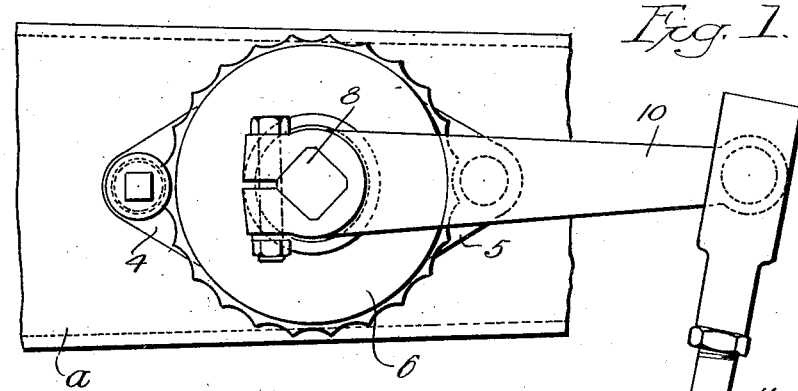
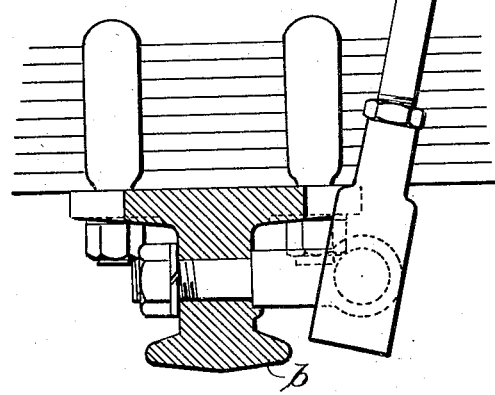
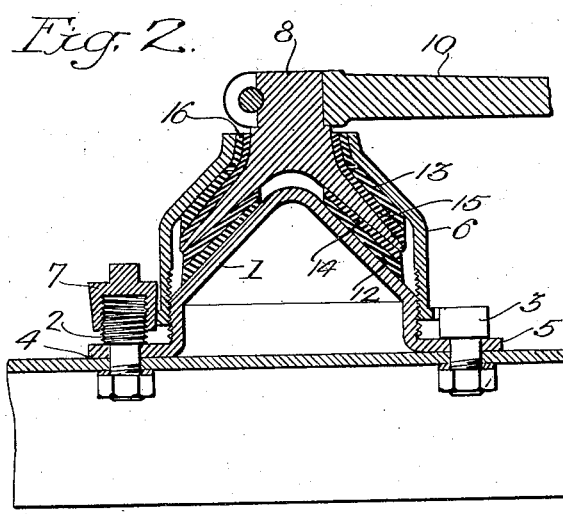

Patented Feb. 2, 1932

1,843,855

UNITED STATES PATENT OFFICE

JOHN WARREN WATSON, OF WAYNE, PENNSYLVANIA

SHOCK ABSORBER

Application filed May 22, 1930. Serial No. 454,744.

This invention relates to shock absorbers and like mechanisms for controlling relative motion between two elements such as, in the case of shock absorbers for vehicles, the vehicle frame and the vehicle axle.

A principal object of the invention is to provide a mechanism for resisting or controlling relative movements of the elements in one direction and also their relative movements in the opposite direction.

A further object of the invention is to provide a mechanism which, during slight relative movements between the elements, offers relatively light resistance.

A still further object of the invention is to provide a mechanism which will offer merely the above relatively light resistance during relatively slight movements of the elements regardless of the relative position of the elements at the start of such movements. That is, when the invention is used as a vehicle shock absorber, regardless of any change in load carried by the vehicle.

A further object of the invention is to provide a mechanism of extremely compact and simple construction and hence one of low cost and of trouble-free and inexpensive maintenance.

Further objects of the invention will appear from the specifications and claims.

One form of the invention is illustrated in the accompanying drawings in which Fig. 1 shows a general elevation of a preferred form of shock absorber embodying the invention as mounted on the frame of a vehicle and operatively connected to an axle of said vehicle.

Fig. 2 is a cross sectional view on line 2—2 Fig. 1.

Referring to the drawings, $a$ is the frame of a vehicle and $b$ is the axle of said vehicle. 1 is a conical-shaped member which constitutes the base of the shock absorber and which is attached to the frame of the vehicle by means of bolts 2 and 3 which project through holes in the ears 4 and 5 which are preferably integral with the base. 6 is the cover member which is adjustably secured to base member 1 by means of threads formed on the outside of the latter and in the interior of the former, as illustrated in Fig. 2. The required adjustment between these two parts is held in place by the tapered lug 7 which screws down over the threaded head of bolt 2, the tapered lug being forced down into any desired one of the notches or scallops formed around the rim of cover member 6. Located within the housing formed by base member 1 and cover member 6 is a conical-shaped member or impeller 8 having a shaft portion which extends through the hole in cover member 6. This shaft portion is provided at its outer end with a squared portion adapted for the attachment of an arm 10, the other end of said arm being adapted to receive a linkage 11 for operatively connecting said arm and the shock absorber with the axle of the vehicle. No description is made of the linkage mechanism, such for example as the customary ball and socket variety, as these linkages are well known to the art and form no part of this invention. Slidably contacting respectively with members 1 and 6 are friction members 12 and 13, which may, for example, be composed of standard brake lining material. These friction members are impelled respectively by resilient rubber members 14 and 15 which in turn are impelled by the impeller member 8 as said impeller member is rotated with relation to members 1 and 6 by means of arm 10. The coefficient of friction between the resilient members 14 and 15 and the steel impeller member 8, and between the rubber members and the friction members 12 and 13 is greater than is the coefficient of friction between the friction members 12 and 13 and the steel housing members 1 and 6. Therefore, during the operation of the device frictional slippage will occur between the friction members and the housing members, and no slippage will occur between the impeller member and the rubber members nor between the rubber members and the friction members. However, due to the presence of the resilient rubber members a certain amount of relative movement between the impeller member and the housing members will take place before the friction members are caused to move with relation to the housing members. At the start of each relative movement as above, there will be a certain amount of stretching of the rubber members before they in turn will cause the friction members to move with relation to the housing members. Thus, a certain free point is provided for small movements between the vehicle frame and vehicle axle before the heavier frictional resistance is brought into play for controlling the larger relative movements between the vehicle frame and the vehicle axle. It will be readily seen and understood that there is no fixed point at which this free point takes place, but that it takes place at the beginning of every movement in either direction regardless of the relative position of the frame and axle as may be fixed by the load carried by the vehicle. This free point which results from the resilience of the rubber members may be altered as desired either as to extent or freeness, by increasing or decreasing the thickness of these rubber members or by altering the composition and hence the resilience of the rubber members.

It will be noted that these rubber discs are thicker at their outside diameter than at their inside diameter. This increase of thickness toward the outside diameter is important in order to insure the rubber being stressed equally over its entire area. For example, at a point on a 2″ radius the relative movement of the parts will be twice that at a point on a 1″ radius. Therefore, the rubber should be substantially twice as thick on the 2″ radius as on the 1″ radius. Likewise, the friction members 12 and 13 may be made progressively thicker toward their outside diameter in order to more equally compensate for the greater wear which will take place where there is greater relative movement between them and the housing members 1 and 6. This tapering of the friction members is not highly important, but the tapering of the resilient rubber members however is highly important in order to stress the rubber equally and thus equally distribute the pulling power between the impeller and the rubbers and the rubbers and the friction members in order to reduce as far as possible any tendency which would result in slippage movement between these members. If desired, the impeller member and the rubber members and the friction members may be all or separately vulcanized or otherwise secured together in a manner which would more surely insure non-slippage than merely to rely upon their relatively high coefficients of friction. This would all be governed by conditions and the specific nature of the material or materials used. 16 is a collar member or bushing preferably made of a more or less flexible material which is for the purpose of keeping dirt and water from entering between the contacting surfaces of friction member 13 and cover member 6. This collar is backed up and held snugly in place against cover member 6 by means of the resilient rubber member 15.

Having thus described my invention, I claim and desire to protect by Letters Patent of the United States:

1. In mechanism for controlling relative motion between two elements, a housing adapted for attachment to one of said elements, a relatively rotatable impeller member within said housing and axially extending therethrough and adapted for connection to said other element, friction means and resilient rubber means positioned between said relatively rotatable members, said rubber means constituting the sole automatic means for maintaining pressure and compensating for wear between said friction means and one of said relatively rotatable members, said rubber means also constituting the sole means for rotating said friction means with relation to said last-mentioned member.

2. In mechanism for controlling relative motion between two elements, a housing adapted for attachment to one of said elements, a relatively rotatable impeller member within said housing and axially extending therethrough and adapted for connection to said other element, friction means and resilient rubber means positioned between said relatively rotatable members, said rubber means constituting the sole automatic means for maintaining pressure and compensating for wear between said friction means and one of said relatively rotatable members, said rubber means also constituting the sole means for rotating said friction means with relation to said last-mentioned member, said rubber means being tapered from thick to thin as it approaches the axis of rotation of said relatively rotatable members.

JOHN WARREN WATSON.